United States Patent
Chheda

(10) Patent No.: US 7,103,701 B2
(45) Date of Patent: Sep. 5, 2006

(54) MEMORY BUS INTERFACE

(75) Inventor: Sachin Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 339 days.

(21) Appl. No.: 10/253,444

(22) Filed: Sep. 23, 2002

(65) Prior Publication Data

US 2004/0059859 A1 Mar. 25, 2004

(51) Int. Cl.
*G06F 13/40* (2006.01)
*G06F 7/38* (2006.01)

(52) U.S. Cl. .................. 710/307; 712/40; 713/375

(58) Field of Classification Search .............. 710/103, 710/104, 307, 314; 370/413; 711/145, 103
See application file for complete search history.

(56) References Cited

U.S. PATENT DOCUMENTS

| | | | | |
|---|---|---|---|---|
| 4,309,754 A | * | 1/1982 | Dinwiddie, Jr. ............. | 710/307 |
| 5,935,428 A | | 8/1999 | Yamamoto et al. | |
| 5,991,841 A | * | 11/1999 | Gafken et al. .............. | 710/104 |
| 6,282,203 B1 | * | 8/2001 | Yeom et al. ................ | 370/413 |
| 6,298,407 B1 | * | 10/2001 | Davis et al. ................ | 710/314 |
| 6,421,765 B1 | * | 7/2002 | Poisner ..................... | 711/145 |
| 6,434,654 B1 | | 8/2002 | Story et al. | |
| 6,851,014 B1 | * | 2/2005 | Chang et al. .............. | 711/103 |
| 2001/0029560 A1 | * | 10/2001 | Delchini ..................... | 710/103 |

OTHER PUBLICATIONS

French Search Report dated Feb. 4, 2004.

* cited by examiner

*Primary Examiner*—Christopher E. Lee

(57) ABSTRACT

An interface allows communication between a host device coupled to a host bus and a target device coupled to a target bus. First, the interface receives the address of the target device from the host device via the host bus, where the address has a first width. Next, the interface converts the received address from the first width into one or more address components each having a second width. Then, the circuit accesses the target device by driving the one or more address components onto the target bus. Such an interface allows for a simple, direct communication path between the host bus, such as a system bus, and a target bus, such as an LPC bus. The interface consolidates several tasks into one general purpose interface, providing savings in components used, design complexity, and overall cost of implementation. Further, the length of time required for communications between interfaced busses is substantially reduced.

21 Claims, 3 Drawing Sheets

MEMORY BUS INTERFACE

BACKGROUND OF THE INVENTION

A Low-Pin Count (LPC) bus is an internal-communication bus for computer systems and has been implemented in recent years to gradually replace the Industry Standard Architecture (ISA) bus. For example, the *LPC Interface Specification* 1.0 available from Intel Corporation of Santa Clara, Calif. calls for an LPC interface between a computer system's core logic chipset and motherboard I/O functions.

The LPC bus architecture is a serial, 7-pin simple bus with a 33 MHz clock. There are no defined slots, unlike the ISA and PCI buses, thus only on-board solutions are used in the LPC architecture. Since its speed is limited to 33 MHz, it is not designed for heavy-duty data transfer. Devices that are likely to be found on the LPC bus are legacy devices, such as Super I/Os, and flash boot devices. The LPC bus architecture is software transparent to higher level I/O functions and is compatible with existing peripheral devices and applications. The LPC bus, however, is not readily compatible with other bus architectures, such as register-based memory buses, because of the discrepancy in the bus speeds.

A system bus is a bus architecture designed to facilitate communication between a computer's central processing system and its register based memory system. The bus speed of a system bus is typically not quite as fast as the CPU speed, but is significantly faster than the speed of the LPC bus. As a result, communication between a system bus and an LPC bus cannot be achieved by a simple interface.

In the past, communication between devices that use the system bus and devices that use the LPC bus was indirect and required a significant firmware/software undertaking. This undertaking proved to require a substantially lengthy processing time. Therefore, a need has arisen to eliminate the substantial length of this undertaking by providing a direct path between the system and the LPC busses.

SUMMARY OF THE INVENTION

In one aspect of the invention, an interface allows communication between a host device coupled to a host bus and a target device coupled to a target bus. First, the interface receives the address of the target device from the host device via the host bus where the address has a first width. Next, the interface converts the received address from the first width into one or more address components each having a second width. Then, the interface accesses the target device by driving the one or more address components onto the target bus.

Such an interface allows for a simple, direct communication path between a host bus, such as a bus system, and a target bus, such as an LPC bus. The interface consolidates several tasks into one general purpose interface, providing savings in components used, design complexity, and overall cost of implementation. Further, the length of time required for communications between different busses is substantially reduced.

DETAILED DESCRIPTION OF THE PREFERRED EMBODIMENT

Figure 1:
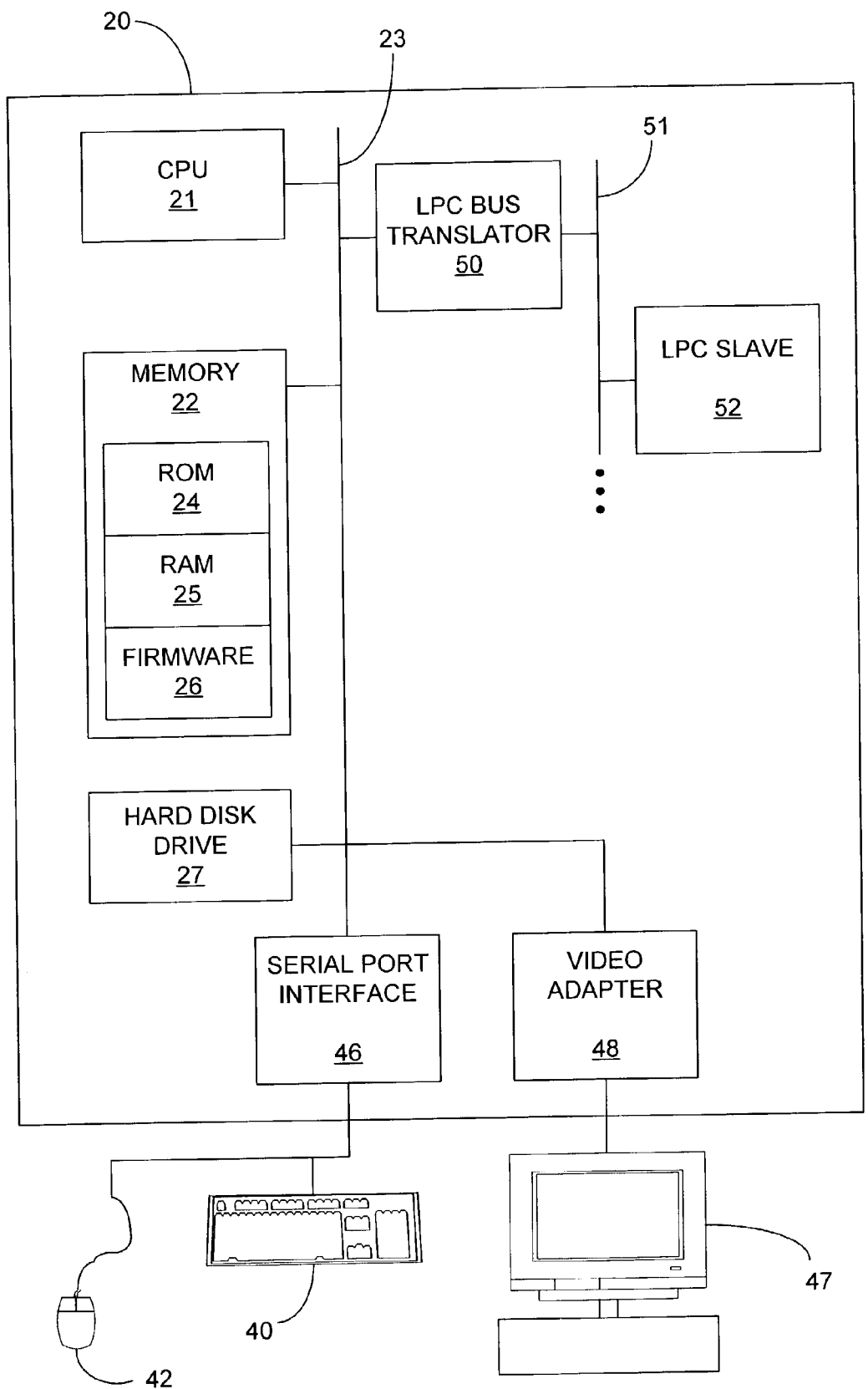
FIG. 1 is a block diagram of a general-purpose computer system that includes an LPC bus interface according to an embodiment of the invention.

Various embodiments of the present invention are directed to a device, system, method, and computer-readable medium for facilitating data communication between two different computer bus architectures. In one embodiment, communication between a register-based memory bus and an LPC bus is achieved. FIG. 1 and the following discussion are intended to provide a brief, general description of a suitable computing environment in which the embodiments of the invention may be implemented. Those skilled in the art will appreciate that the invention may be practiced with other computer system configurations, such as, for example, handheld devices, networked PCs, minicomputers, mainframe computers, multiprocessor systems, microprocessor-based or programmable embedded computers, the like. The invention may also be practiced in distributed computing environments where tasks are performed by remote processing devices that are linked through a communication network.

FIG. 1 is a block diagram of a general-purpose computing device in the form of a conventional personal computer 20 according to an embodiment of the invention. The computer 20 includes a processing unit 21, a system memory 22, and a system bus 23. The system bus 23 couples the various system components, including the system memory 22, to the processing unit 21. The system bus 23 may be any of several types of busses including a memory bus, a peripheral bus, and a local bus using any of a variety of bus architectures.

The system memory 22 includes a read-only memory (ROM) 24, a random-access memory (RAM) 25, and firmware 26, which contains the basic routines that help to transfer information between devices of the personal computer 20. The personal computer 20 further includes a hard disk drive 27 that is also connected to the system bus 23 through a hard disk controller (not shown). Additionally, optical drives, CD-ROM drives, floppy drives (not shown) may be connected to the system bus 23 through respective drive controllers (not shown) as well.

A number of program modules may be stored on the hard disk drive 27 or in the ROM 24 or RAM 25, including an operating system, one or more application programs, and other data. A user (not shown) may enter commands and information into the personal computer 20 through input devices such as a keyboard 40 and pointing device 42. These input devices as well as others not shown are typically connected to the system bus 23 through a serial port interface 46. Other interfaces (not shown) include Universal Serial Bus (USB) and parallel ports. A monitor 47 or other type of display device may also connect to the system bus 23 via an interface such as a video adapter 48.

Still referring to FIG. 1 an LPC bus 51 has one or more LPC slave devices 52 (only one slave device shown in FIG. 1) connected to it. An LPC bus interface 50 interfaces the LPC bus 51 to the system bus 23. In one embodiment the LPC bus 51 is a serial, 7-pin simple bus with a 33 MHz clock, and there are no defined interface slots for any number of LPC slave devices 52. Furthermore, in one embodiment the address/data portion of the LPC bus 51 is only four bits wide, and the address and data portions of the system bus 23 are sixteen and eight bits wide, respectively. Consequently, the LPC-bus interface 50 converts system address words and data bytes into respective LPC address and data nibbles, and vice versa. Alternatively, the LPC bus 51 and the system bus 23 may have different sizes from those disclosed. But in each case, the LPC interface 50 converts addresses and data into the proper widths.

Furthermore, the components, such as the memory 22, coupled to the system bus 23 are mapped to a system address space, which typically has two subspaces: the data space and the I/O space, which in one embodiment includes $2^{16}$ byte-sized memory locations. In one embodiment, the LPC address space, which is the range of addresses assigned to the LPC slave devices 52 connected to the LPC bus 51, is located within the system I/O space. But the LPC address space could alternatively reside in the system data space.

Figure 2:
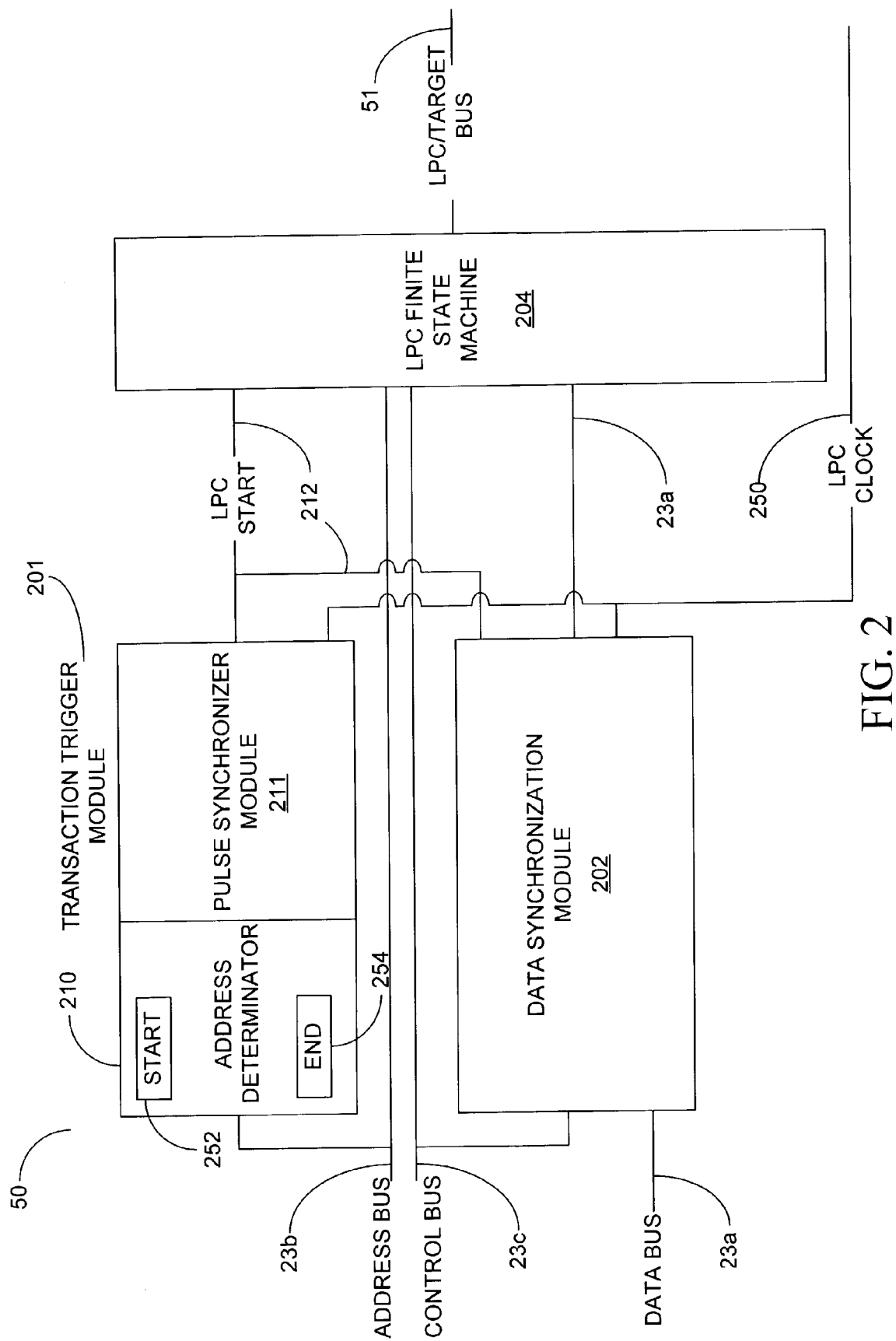
FIG. 2 is a block diagram of the LPC bus interface of FIG. 1 according to an embodiment of the invention.

With reference to FIG. 2, the system bus 23 and the LPC-bus interface 50 of FIG. 1 are shown in greater detail according to an embodiment of the invention. The system bus 23 transfers information from a host to a target using memory-bus read/write transactions and comprises three sub-busses: a data bus 23a, an address bus 23b, and a control bus 23c. A read/write transaction is defined as an exchange of information between a host and a target in a predetermined protocol. Because a system-bus 23 protocol is different from an LPC-bus 51 protocol, it is necessary to provide the interface 50 to allow read/write transactions to be communicated between the busses 23 and 51.

The LPC-bus interface 50 comprises three basic parts that are used to convert system-bus read/write transactions into LPC-bus read/write transactions. A transaction-trigger module 201 triggers the start of an LPC transaction based upon the detection of a predetermined LPC address on the system bus 23. A data synchronization module 202 synchronizes data transfers between the system bus 23 and the LPC bus 51, and a finite state machine 204 implements the data transfers. It takes one LPC "transaction" to either write data to or read data from the LPC device 52, and such a transaction typically requires multiple cycles of the LPC clock 250. For example, where the address bus 23b is sixteen bits wide, the data bus 23a is eight bits wide, and the LPC bus 51 is only four bits wide, a typical LPC read/write transaction takes thirteen cycles of the LPC clock 20.

The transaction-trigger module 201 monitors the address bus 23b of the system bus 23 by "looking" for an address within the pre-determined LPC address space. The address determinator 210 detects, in a conventional manner, an LPC address that is placed on the system address bus 23b by a system component such as the CPU 21 (FIG. 1). In response to the determinator 210 detecting an LPC address, the pulse synchronization module 211 generates an LPC-start pulse 212 that is synchronized to an edge of the LPC clock 250. In one embodiment, the LPC-start pulse 212 has a duration of one LPC clock cycle.

In one embodiment, the addresses of the LPC address space are "hard wired" into the address determinator 210. That is, the determinator 210 includes logic circuitry designed to recognize addresses within a predetermined LPC address space. Consequently, if one wishes to change the LPC address space, he must acquire a new chip that includes a determinator 210 designed to recognize the new LPC address space.

But in a second embodiment, the LPC address space is programmable into the address determinator 210. Specifically, the determinator 210 includes a first register 252 for storing a starting address of the LPC address space, and a second register 254 for storing an ending address of the LPC address space. The address determinator 210 determines the intermediate addresses that are between the starting and ending address using a conventional algorithm. Consequently, one can move the LPC address space without having to obtain a new chip. Furthermore, the starting and ending LPC addresses can be loaded into the registers 252 and 254 at any time, such as during boot of the system 20.

The data-synchronization module 202 synchronizes data from and to the bus 23a during an LPC write or read transaction, respectively. During an LPC write transaction, the data-synchronization module 202 latches data from the bus 23a in response to a write signal on the control bus 23c and the LPC start pulse 212. The module 202 then provides this latched data to the finite state machine 204. During an LPC read transaction, the data-synchronization module 202 receives data from an LPC device 52 via the LPC bus 51, finite state machine 204, and data bus 256, and provides this data to the system data bus 23a. In one embodiment, the module 202 receives a system clock on the control bus 23c and synchronizes the transfer of data to the bus 23a with the system clock. In another embodiment, the module 202 functions asynchronously with respect to the system bus 23a. Specifically, the module 202 is conventionally programmed with the length, in LPC clock cycles, of an LPC read transaction. Consequently, the module 202 starts counting the LPC clock cycles in response to the LPC start pulse 212, and drives the data received from the LPC device 52 onto the data bus 23a until the end (or sometime before the end) of the read transaction. If the LPC clock is an integer multiple of the system clock, then this insures that the read transaction will end in synchronization with the bus 23a. For example, in one embodiment, the LPC clock 250 is twice the frequency of the system clock.

The finite state machine 204 converts the data and addresses into the formats necessary to allow-transfer between the system busses 23a and 23b and the LPC bus 51. Specifically, during an LPC write transaction, the state machine 204 converts the data and address from the system busses 23a and 23b into an LPC format suitable for transfer onto the LPC bus 51. Similarly, during an LPC read transaction, the state machine 204 converts the address from the system address bus 23b into a format suitable for transfer onto the LPC bus 51, and converts the data from the LPC bus into a format suitable for transfer onto the system data bus 23a. For example, during an LPC write transaction, the state machine 204 converts a byte of data and a sixteen-bit address from the system busses 23a and 23b into two nibbles of data and four nibbles of address suitable for transfer onto the four-bit LPC bus 51. Similarly, during an LPC read transaction, the state machine 204 converts the sixteen-bit address from the system address bus 23b into four nibbles of address suitable for transfer onto the address/data portion of the LPC bus 51, and converts two nibbles of read data from the address/data portion of the LPC bus into a byte of data suitable for transfer onto the system data bus 23a.

It is important to note that in typical bus transactions, one device at a time may drive the bus. In order to relinquish control of the bus, the device so indicates relinquishment and waits for a response from another device that accepts control of the bus. In this fashion, only one device at a time is driving the bus, and, as a result, data is properly transferred from device to device.

Figure 3:
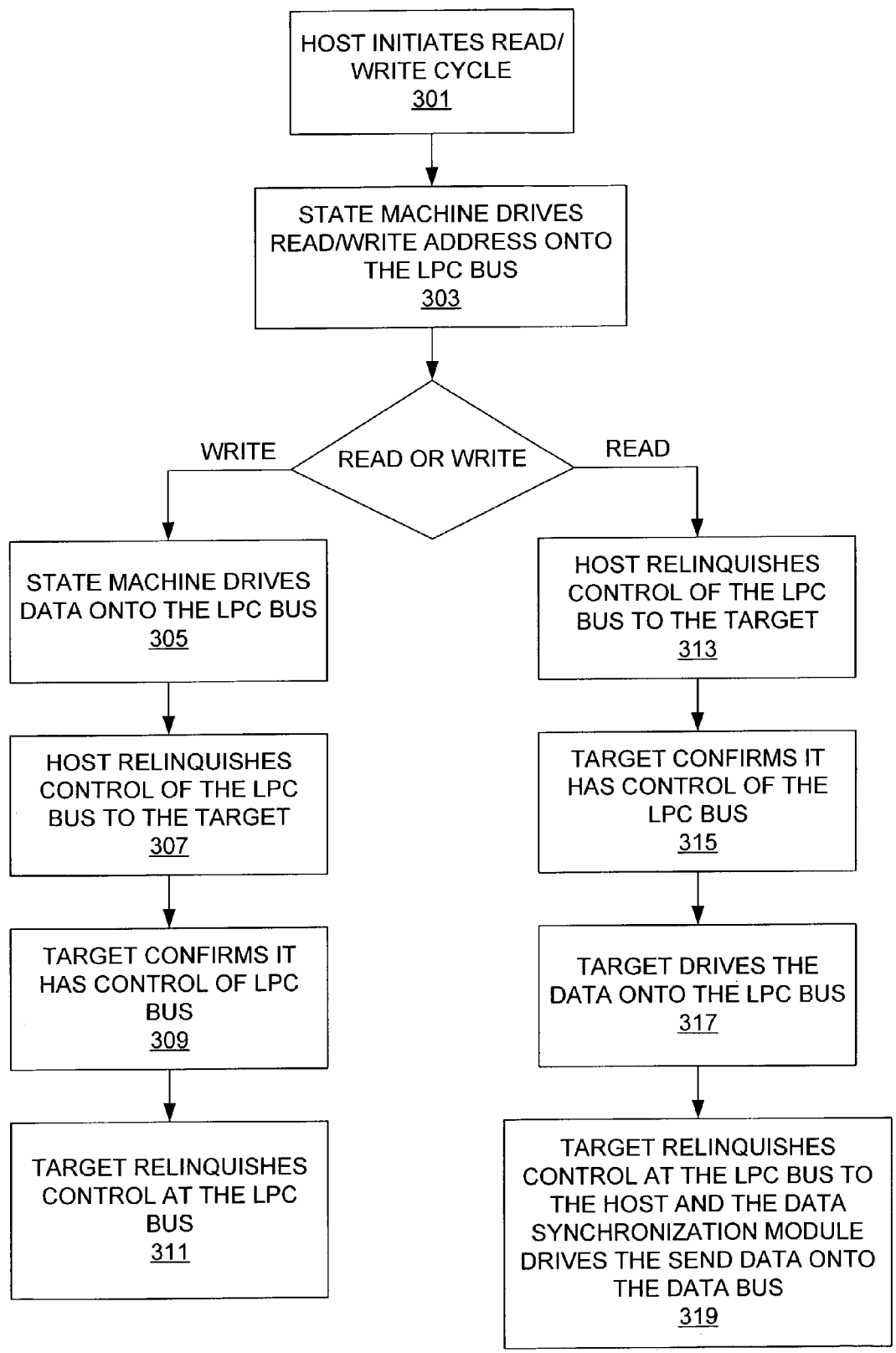
FIG. 3 is a flow chart of the operation of the LPC bus interface of FIG. 2 according to an embodiment of the invention.

FIG. 3 is a flow chart of the operation of the LPC interface 50 of FIG. 2 during an LPC write transaction and an LPC read transaction according to an embodiment of the invention. Reference is also made to FIG. 1 during this discussion. For the purposes of this discussion, the "host" refers to any device (such as the CPU 21) that resides on the system-bus side of the LPC interface 50, and "target" refers to any device (such as the LPC slave 52) that resides on the LPC-bus side of the LPC interface 50.

First, an LPC write transaction is discussed, where a host device coupled to the system bus 23 writes data to the target LPC slave 52.

Referring to step 301, the host device such as the CPU 21 initiates the LPC write transaction. Specifically, the CPU 21 drives the system address bus 23b with the LPC address (within the LPC address space) of the LPC slave 52, drives the system data bus 23a with the data to be written, and drives the system control bus 23c with a write signal. Next, the address determinator 210 detects that the address on the bus 23b is an LPC address. Then, in response to this detection, the pulse synchronization module 211 generates the LPC pulse 212 for one LPC clock cycle. In response to the LPC pulse 212, the finite state machine 204 notifies the target devices, including the LPC slave device 52, coupled to the LPC bus 51 that a host device is writing data to one of the LPC devices. The state machine 204 makes this notification via the LPC bus 51. In one embodiment, this notification is performed conventionally according to the LPC bus protocol. Also in response to the LPC pulse 212, the state machine 204 initializes its storage registers (not shown) and then latches the address on the system bus 23b and the control signals, including the write signal, on the system control bus 23c in these registers. Similarly, in response to the LPC pulse 212, the data synchronization module initializes its storage register (not shown) and latches the data on the system data bus 23b in this register. In one embodiment, step 301 takes two cycles of the LPC clock 250.

Next, referring to step 303, the state machine 204 drives the write address latched from the system address bus 23b onto the LPC bus 51. In one embodiment, this address is sixteen bits wide and the address/data portion of the LPC bus 51 is only four bits wide. Therefore, the state machine 204 serially drives the write address nibble by nibble—from the most significant nibble to the least significant nibble—onto the LPC bus 51 in synchronization with the LPC clock 250. Because the LPC targets such as the LPC device 52 are configured to recognize sixteen-bit addresses, the LPC targets receive and decode all four nibbles of the address to determine which of the targets is being addressed. In such an embodiment, this step takes four cycles of the LPC clock 250. Alternatively, the address and the address/data portion of the LPC bus 51 may have widths that are different than sixteen bits and four bits respectively. Regardless, the state machine 204 converts the address from the system bus 23b into a format suitable for transmission on the LPC bus 51. Of course if the system address is in a format that is compatible with the LPC bus 51, such conversion may be unnecessary.

Then, referring to step 305, the state machine 204 drives the write data latched in the data synchronization module 202 onto the LPC bus 52. In one embodiment, this data is eight bits wide and the LPC bus 51 is only four bits wide. Therefore, the state machine 204 receives the write data from the module 202 via the bus 256 serially drives the write data nibble by nibble—from the least significant nibble to the most significant nibble—onto the four-bit-wide address/data portion of the LPC bus 51 in synchronization with the LPC clock 250. Because the LPC targets such as the LPC device 52 are configured to recognize a byte of data, the addressed LPC target receives both nibbles of data and reconstructs the data byte from these nibbles. In such an embodiment, step 305 takes two cycles of the LPC clock 250. Alternatively, the data and the address/data portion of the LPC bus 51 may have widths that are different than eight bits and four bits respectively. Regardless, the state machine 204 converts the data from the system bus 23a into a format suitable for transmission on the LPC bus 51. Of course if the system data is in a format that is compatible with the LPC bus 51, such conversion may be unnecessary.

Next, referring to step 307, the host device relinquishes control of the LPC bus 51 to the target device. Specifically, the state machine 204 drives a relinquishment value, for example 0xF hexadecimal, onto the LPC bus 51. This is often referred to as the first cycle for bus-drive turnaround. Then, both the state machine 204 and the LPC target devices, including the slave device 52, tristate the LPC bus 51 to mark the second cycle for bus-drive turnaround. Step 307 takes two cycles of the LPC clock 250.

Then, referring to step 309, the target device that will take control of the LPC bus 51 drives a ready signal onto the LPC bus 51 to indicate that the device is taking control of the bus 51. But in this case, because during a write transaction no LPC target device need take control of the LPC bus 51, a designated or default target device (not shown) drives the ready signal onto the bus 51 to confirm control of the bus 51 is now with the default target device. Step 309 takes one cycle of the LPC clock 250.

Next, referring to step 311, the target device relinquishes control of the LPC bus 51 back to the host device. Specifically, the default target device drives a relinquishment value, for example 0xF hexadecimal, onto the LPC bus 51 to mark the first cycle for bus-drive turnaround. Then, both the state machine 204 and the target devices, including the slave device 52, tristate the LPC bus 51 to mark the second cycle for bus-drive turnaround. Next, the LPC bus 51 is idle to mark the end of the write transaction, and remains idle until a host initiates a subsequent transaction. Step 311 takes two cycles of the LPC clock 250.

Second, an LPC read transaction is discussed, where a host device, such as the CPU 21 coupled to the system bus 23 reads data from the target LPC slave 52.

Referring to step 301, the host device such as the CPU 21 initiates the LPC read transaction. Specifically, the CPU 21 drives the system address bus 23b with the LPC address (within the LPC address space) of the LPC slave 52 and drives the system control bus 23c with a read signal. Next, the address determinator 210 detects that the address on the bus 23b is an LPC address. Then, in response to this detection, the pulse synchronization module 211 generates the LPC pulse 212 for one LPC clock cycle. In response to the LPC pulse 212, the finite state machine 204 notifies the target devices, including the LPC slave device 52, coupled to the LPC bus 51 that a host device is reading data from one of the LPC devices. The state machine 204 makes this notification via the LPC bus 51. In one embodiment, this notification is performed conventionally according to the LPC bus protocol. Also in response to the LPC pulse 212, the state machine 204 initializes its storage registers (not shown) and then latches the address on the system bus 23b and the control signals, including the write signal, on the system control bus 23c in these registers. Similarly, in response to the LPC pulse 212, the data synchronization module 202 initializes its storage register (not shown). In one embodiment, step 301 takes two cycles of the LPC clock 250.

Next, referring to step 303, the state machine 204 drives the read address latched from the system address bus 23b onto the LPC bus 51. In one embodiment, this address is sixteen bits wide and the address/data portion of the LPC bus 51 is only four bits wide. Therefore, the state machine 204 serially drives the read address nibble by nibble—from the most significant nibble to the least significant nibble—onto the LPC bus 51 in synchronization with the LPC clock 250, and the LPC targets receive and decode all four nibbles of the address to determine which of the targets is being addressed. In such an embodiment, this step takes four cycles of the LPC clock 250. Alternatively, the address and the address/data portion of the LPC bus 51 may have widths that are different than sixteen bits and four bits respectively. Regardless, the state machine 204 converts the address from the system bus 23b into a format suitable for transmission on the LPC bus 51. Of course if the system address is in a format that is compatible with the LPC bus 51, such conversion may be unnecessary.

Next, referring to step 313, the host device relinquishes control of the LPC bus 51 to the LPC slave 52. Specifically, the state machine 204 drives a relinquishment value, for example 0xF hexadecimal, onto the LPC bus 51, during the first cycle for bus-drive turnaround. Then, both the state machine 204 and the LPC targets, including the slave device 52, tristate the LPC bus 51 to mark the second cycle for bus-drive turnaround. Step 313, like step 307 of the write transaction, takes two cycles of the LPC clock 250.

Then, referring to step 315, the LPC target to be read, here the LPC slave 52, drives a ready signal onto the LPC bus 51 to indicate it is taking control of the bus 51. Step 315, like step 309 of the write transaction, takes one cycle of the LPC clock 250.

Next, referring to step 317, the target, here the LPC slave 52, drives the read data onto the LPC bus 51. In an embodiment where the read data is eight bits wide and the address/data portion of the LPC bus 51 is only four bits wide, the slave 52 serially drives this data nibble by nibble—from the least significant nibble to the most significant nibble—onto the LPC bus 51 in synchronization with the LPC clock 250. The state machine 204 receives these nibbles and stores them together as a single byte of read data, and provides this byte of data to the data synchronization module 202. In such an embodiment, step 317 takes two cycles of the LPC clock 250. Alternatively, the data and the address/data portion of the LPC bus 51 may have widths that are different than eight bits and four bits respectively. Regardless, the LPC slave 52 provides the read data in a format suitable for transmission on the LPC bus 51, and the state machine 204 converts this data into a format suitable for transmission on the system data bus 23a. Of course, if the LPC data is in a format that is compatible with the system data bus 23a, such conversion may be unnecessary.

Next, referring to step 319, the LPC target relinquishes control of the LPC bus 51 back to the host. Specifically, the LPC slave 52 drives a relinquishment value, for example 0xF hexadecimal, onto the LPC bus 51 to mark the first cycle for bus-drive turnaround. Then, both the state machine 204 and the LPC targets, including the slave device 52, tristate the LPC bus 51 to mark the second cycle for bus-drive turnaround. Next, the LPC bus 51 is idle to mark the end of the read transaction, and remains idle until a host initiates a subsequent transaction. Step 311 takes two cycles of the LPC clock 250.

Still referring to step 319, while the LPC target is relinquishing control of the LPC bus 51, the data synchronization module 202 drives the read data onto the system data bus 23a. Where the interface between the module 202 and the data bus 23a is asynchronous, the module 202 stops driving the data onto the bus 23a by the end of the read transaction. Specifically, as stated above, the read transaction spans thirteen cycles of the LPC clock 250, beginning with the generation of the LPC start pulse 212. Therefore, the module 202 begins counting the number of LPC clock cycles in response to the pulse 212, asynchronously drives the read data from the state machine 204 onto the bus 23a, and stops driving the read data onto the bus 23a by the end of the thirteenth LPC clock cycle. Alternatively, if the interface between the module 202 and the data bus 23a is synchronous, the module operates in a similar manner except that it drives the data onto the bus 23a, and stops driving the data, in synchronization with the system clock (not shown).

While the preferred embodiment of the invention has been illustrated and described, it will be appreciated that various changes can be made therein without departing from the spirit and scope of the invention.

I claim:

1. An interface coupled between a host bus and a target bus, the host bus coupled to a host device and the target bus coupled to a target device, the interface comprising:
   a trigger module operable to receive from the host device via the host bus an address of the target device, the address having a first width;
   a state machine operable to,
      convert the received address from the first width into one or more address components each having a second width different from the first width,
      access the target device by driving the one or more address components onto the target bus,
      receive from the target device via the target bus one or more data components each having the second width, and
      convert the received data components into data having a third width different from the first and second widths; and
   a data synchronization module operable to allow the host device to read the one or more data components by driving the data onto the host bus.

2. The interface of claim 1 wherein:
   the first width comprises sixteen bits; and
   the second width comprises four bits.

3. The interface of claim 1 wherein accessing the target device comprises sequentially driving the one or more address components onto the target bus.

4. The interface of claim 1, wherein:
   the data synchronization module is further operable to receive from the host device via the host bus data having the third width; and
   the state machine is further operable to,
      convert the received data from the third width into one or more data components each having the second width, and
      write the data to the target device by driving the one or more data components onto the target bus.

5. A bus interface for allowing communication between a system bus and a low pin count (LPC) bus, the interface comprising:
   a trigger module coupled to the system bus and operable to detect on the system bus a predetermined address that indicates the start of a LPC transaction, the address having a first width;
   a data synchronization module connected to the system bus and operable to synchronize data transfers from the system bus to the LPC bus and from the LPC bus to the system bus, the data on the LPC bus having a second width different from the first width and the data on the system bus having a third width different from the first and second widths; and
   a state machine coupled to the trigger module, data synchronization module, and LPC bus and operable to transfer the predetermined address from the system bus to the LPC bus and to transfer data received from the data synchronization module to the LPC bus.

6. The bus interface of claim 5 wherein the trigger module comprises:
   an address determinator for detecting the predetermined address; and
   a pulse synchronization module operable to initiate the LPC transaction in response to the detection of the predetermined address.

7. The bus interface of claim 5 wherein the trigger module comprises:
   an address determinator for detecting the predetermined address; and
   a pulse synchronization module operable to generate an LPC initiation pulse in response to the detection of the predetermined address.

8. The bus interface of claim 5 wherein the state machine is operable to:
   convert the predetermined address into an address format compatible with the LPC bus;
   convert data from the system bus into a data format compatible with the LPC bus; and
   convert data from the LPC bus into a data format that is compatible with the system bus.

9. An electronic system comprising:
   a first bus;
   a second bus;
   a first device coupled to the first bus;
   a second device coupled to the second bus and having an address of a first width; and
   a bus interface coupled to the first and second busses, the interface operable to:
   receive from the first device via the first bus the address of the second device;
   convert the received address from the first width into one or more address components each having a second width;
   access the second device by driving the one or more address components onto the second bus;
   receive from the second device via the second bus one or more data components each having the second width;
   convert the received data components into data having a third width different from the first and second widths; and
   allow the first device to read the one or more data components by driving the data onto the first bus.

10. The electronic system of claim 9 wherein:
    the first bus comprises a sixteen bit address bus and an eight bit data bus; and
    the second bus comprises a single four bit address/data portion.

11. The electronic system of claim 9 wherein the first device comprises a processor.

12. The electronic system of claim 9 wherein:
    the first bus comprises a system bus; and
    the second bus comprises a low-pin-count bus.

13. A method, comprising:
    receiving from a host device via a host bus an address of a target device coupled to a target bus, the address having a first width;
    converting the received address from the first width into one or more address components each having a second width different from the first width;
    accessing the target device by driving the one or more address components onto the target bus;
    receiving from the target device via the target bus one or more data components each having the second width;
    converting the received data components into data having a third width different from the first width; and
    allowing the host device to read the one or more data components by driving the data onto the host bus.

14. The method of claim 13 wherein the second width comprises four bits.

15. The method of claim 13 wherein accessing comprises sequentially driving the one or more address components onto the target bus.

16. A method, comprising:

receiving on a host bus data from a host device, the data having a first width;

converting the received data from the first width into one or more data components each having a second width;

writing the data to a target device by driving the one or more data components onto a target bus;

receiving from the target device via the target bus one or more data components each having the second width;

converting the received data components into data having a third width different from the first and second widths; and allowing the host device to read the one or more data components by driving the data onto the host bus.

17. The method of claim 16 wherein the second width comprises four bits.

18. The method of claim 16 wherein writing comprises sequentially driving the one or more data components onto the target bus.

19. A method, comprising:

accessing a target device by driving onto a target bus one or more address components having a first width;

receiving from the target device via the target bus one or more data components each having a second width;

converting the received data components into data having a third width different from the first and second widths; and allowing a host device to read the one or more data components by driving the data onto a host bus.

20. The method of claim 19 wherein the second width comprises four bits.

21. The method of claim 19 wherein the third width comprises eight bits.

* * * * *